(No Model.)
S. HARRIS.
Harrow.
No. 232,641.  Patented Sept. 28, 1880.
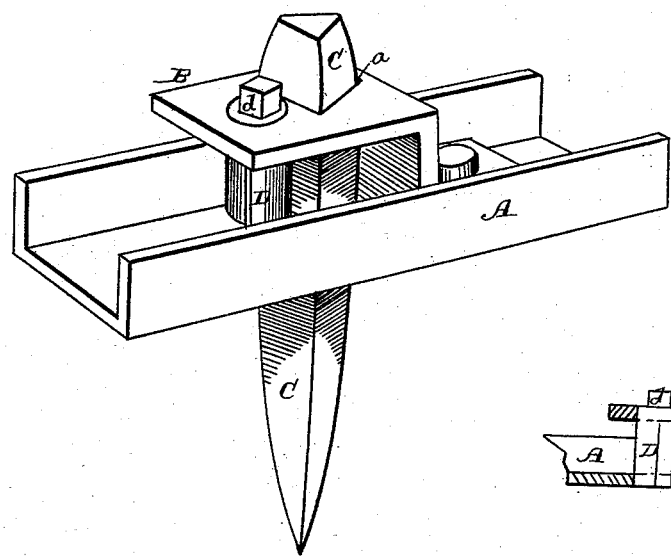
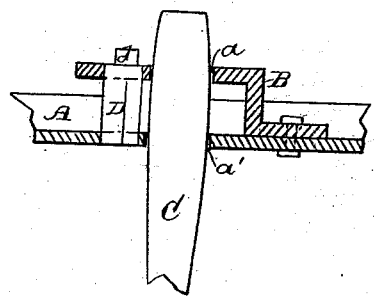
Witnesses
Frank A. Brooks
Geo. H. Strong.
Inventor
Silas Harris
By Dewey & Co.
Attys

UNITED STATES PATENT OFFICE.

SILAS HARRIS, OF SAN FRANCISCO, CALIFORNIA.

HARROW.

SPECIFICATION forming part of Letters Patent No. 232,641, dated September 28, 1880.

Application filed March 17, 1880. (No model.)

*To all whom it may concern:*

Be it known that I, SILAS HARRIS, of the city and county of San Francisco, and State of California, have invented an Improvement in Harrows; and I hereby declare the following to be a full, clear, and exact description thereof.

The object of my invention is to provide an improved means of securing teeth in harrows so that they will remain fixed, but may be readily removed when desired. This object I attain by providing a cam or eccentric which will jam the tooth in place and hold it there. When, however, it is desired to remove the tooth, by turning the cam the tooth is loosened, as is more fully described in the accompanying drawings, in which—

Figure 1 is a view of my invention. Fig. 2 is a section.

Let A represent the bars of the harrow, which I form, preferably, of channel-iron, placed in the manner shown. Riveted in the channel of the iron is an upwardly-extending angulated brace or arm, B, having a slot, $a$, placed in line with the slot $a'$ of the channel-iron, into which the tooth C fits. This tooth I have shown as triangular, but it may be made square or in any other desired shape. Swiveled in the channel-iron bar and in the brace B is an eccentric or cam, D, having a square head, $d$, as shown, by means of which it may be turned with a wrench or key. When the tooth is placed in position by being dropped from above through the slots $a \ a'$, it slides down beside the cam and has a bearing on the edges of said slots $a \ a'$. By turning the eccentric or cam with the wrench said cam jams against the side of the tooth and holds it fixedly in position. The tooth then has a bearing extending from the brace B to the channel-iron.

To release the tooth the eccentric is turned back, when the tooth may be drawn out without the necessity of pounding or hammering or otherwise injuring its point.

A tooth placed in the harrow in this manner will not be loosened by any strain, and it has so broad a bearing that it is fixedly and securely held in place at all times. The upwardly-projecting brace being above the bar or beam, it will not become covered with rubbish.

In Fig 2 I have shown the eccentric or cam formed on the tooth itself. The brace B is formed and attached to the channel-iron bar, as before described, except that there is only one hole in it, and that for the head of the tooth. The tooth itself is made cam-shaped, and being placed in a cam-shaped hole, by placing a wrench on the square head of the tooth and turning it the tooth is jammed tightly in place. A reverse movement of the wrench releases it.

Teeth made in this shape are formed in the rolls of a mill and afterward sharpened. The act of turning the tooth automatically secures it in place.

Having thus described my invention, what I claim as new, and desire to secure by Letters Patent, is—

In combination with the channel-iron harrow-bars A, provided with a slotted brace, B, for carrying the tooth C, the swiveled eccentric or cam D, with its head $d$, whereby said tooth is held in place or is removable at will, and its bearing is extended, substantially as and for the purpose herein described.

In witness whereof I have hereunto set my hand.

SILAS HARRIS.

Witnesses:
 CHAS. E. YALE,
 FRANK A. BROOKS.